(12) United States Patent
Niemela (10) Patent No.: US 8,218,421 B2
(45) Date of Patent: Jul. 10, 2012

(54) DATA TRANSMISSION IN A MOBILE COMMUNICATION SYSTEM APPARATUS, SYSTEM AND METHOD

(75) Inventor: Kari Juhani Niemela, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 800 days.

(21) Appl. No.: 12/289,915

(22) Filed: Nov. 6, 2008

(65) Prior Publication Data

US 2009/0190548 A1 Jul. 30, 2009

Related U.S. Application Data

(60) Provisional application No. 60/996,210, filed on Nov. 6, 2007.

(51) Int. Cl.
*H04J 11/00* (2006.01)
(52) U.S. Cl. .......................... 370/207; 370/330; 375/267
(58) Field of Classification Search .................. 370/207, 370/208, 330, 329, 339; 375/267
See application file for complete search history.

(56) References Cited

U.S. PATENT DOCUMENTS

| 7,729,232 | B2* | 6/2010 | Wang et al. | 370/203 |
| 2006/0066480 | A1* | 3/2006 | Kostanic et al. | 342/378 |
| 2007/0054624 | A1* | 3/2007 | Kashiwagi | 455/67.13 |
| 2008/0159246 | A1 | 7/2008 | Niemela | |

FOREIGN PATENT DOCUMENTS

| EP | 1065854 A2 | 1/2001 |
| WO | 99/39484 A2 | 8/1999 |
| WO | 2008/081076 A1 | 7/2008 |

OTHER PUBLICATIONS

Hong Jiang and Paul A. Wilford, "A Hierarchical Modulation for Upgrading Digital Broadcast Systems", IEEE Transactions on Broadcasting, vol. 51, No. 2, Jun. 1, 2005, pp. 223-229 (7 pages).
International Search Report PCT/EP2008/064877 filed Nov. 3, 2008.

* cited by examiner

*Primary Examiner* — Donald Mills
*Assistant Examiner* — Henry Baron
(74) *Attorney, Agent, or Firm* — Squire Sanders (US) LLP (57) ABSTRACT

An apparatus, system, and method may include providing a plurality of data streams in respective subchannels and modulating a first data stream of the plurality of data streams at least partially with a different modulation constellation than a second data stream of the plurality of data streams. The method may also include transmitting the first and second data streams using a same radio resource to user terminals using different subchannels of the radio resource.

6 Claims, 6 Drawing Sheets

DATA TRANSMISSION IN A MOBILE COMMUNICATION SYSTEM APPARATUS, SYSTEM AND METHOD

CROSS-REFERENCE TO RELATED APPLICATIONS

This application claims priority of U.S. Provisional Patent Application Ser. No. 60/996,210, filed on Nov. 6, 2007. The subject matter of this earlier filed application is hereby incorporated by reference in its entirety.

BACKGROUND OF THE INVENTION

1. Field of the Invention

The present invention relates generally to communication systems. More specifically, the present invention relates to data transmission in a mobile communication network.

2. Description of the Related Art

Increasing capacity for voice data is generally desirable in mobile communication networks. In existing networks, it is generally desirable to provide increased voice data capacity in such a manner that either no or negligible modifications to the terminals or the network are needed to support new functionality. Further, system capacity gains provided by advanced receivers, such as Single Antenna Interference Cancellation (SAIC), should not be compromised by the new functionality.

SUMMARY OF THE INVENTION

In one embodiment of the present invention, a method may include providing a plurality of data streams in respective subchannels and modulating a first data stream of the plurality of data streams at least partially with a different modulation constellation than a second data stream of the plurality of data streams. The method may also include transmitting the first and second data streams using a same radio resource to user terminals using different subchannels of the radio resource. In some embodiments, the radio resource may be a frequency, a timeslot, or a combination thereof. In some embodiments, modulating of a first and a second subchannel may differ with respect to payload data of a radio burst and the first and second subchannels may share a common training sequence. In some embodiments, a first and a second subchannel may use substantially or completely mutually orthogonal training sequence pairs such that the first and the second subchannels use different training sequences.

In certain embodiments, signal power provided for a first subchannel may be larger than signal power provided for a second subchannel. In certain embodiments, the method may also include determining downlink data reception properties for signals received by the user terminals based on information exchanged with the user terminals, estimating a required output power for the plurality of subchannels, determining a difference in the required output power between the subchannels and selecting one or more of appropriate modulation constellations and fractions over time based on the determined difference in required output power between the subchannels. In come embodiments, the method may include rotating symbols of the data streams.

In another embodiment of the present invention, an apparatus may include a control unit configured to provide a plurality of data streams in respective subchannels and modulate a first data stream of the plurality of data streams at least partially with a different modulation constellation than a second data stream of the plurality of data streams. The apparatus may also include a transmitter configured to transmit the first and second data streams using a same radio resource to user terminals using different subchannels of the radio resource. In some embodiments, the radio resource may be a frequency, a timeslot, or a combination thereof. In some embodiments, modulating of a first and a second subchannel by the control unit may differ with respect to payload data of a radio burst and the first and second subchannels may share a common training sequence. In some embodiments, a first and a second subchannel may use substantially or completely mutually orthogonal training sequence pairs such that the first and the second subchannels use different training sequences.

In certain embodiments, the control unit may be further configured to provide signal power for a first subchannel that is larger than signal power provided for a second subchannel. In certain embodiments, the control unit may be further configured to determine downlink data reception properties for signals received by the user terminals based on information exchanged with the user terminals, estimate a required output power for the plurality of subchannels, determine a difference in the required output power between the subchannels and select one or more of appropriate modulation constellations and fractions over time based on the determined difference in required output power between the subchannels. In some embodiments, the apparatus may be further configured to rotate symbols of the data streams.

In yet another embodiment, a method may include receiving a training sequence and an indication of an allocated subchannel, receiving a data stream and demodulating the received data stream to determine a signal intended for a user terminal based on the received training sequence and the subchannel allocation. In some embodiments, the method may include performing single antenna interference cancellation for binary phase-shift keying interference. In some embodiments, the method may include transmitting an indication that the user terminal is capable of receiving data on an orthogonal subchannel. In some embodiments, the method may include exchanging information about usage of radio resources with a base station.

In certain embodiments, the received data stream may be demodulated using a modulation constellation. In certain embodiments, the training sequence may be demodulated with a first modulation constellation and payload data may be demodulated with a second modulation constellation. In certain embodiments, the second modulation constellation may be phase shifted with respect to the first modulation constellation.

In still another embodiment, an apparatus may include a receiving unit configured to receive a training sequence and an indication of an allocated subchannel and to receive a data stream. The apparatus may also include a demodulating unit configured to demodulate the received data stream to determine a signal intended for a user terminal based on the received training sequence and the subchannel allocation. In some embodiments, the apparatus may include an interference cancellation unit configured to perform single antenna interference cancellation for binary phase-shift keying interference. In some embodiments, the apparatus may include a transmitter configured to transmit an indication that the apparatus is capable of receiving data on an orthogonal subchannel. In some embodiments, the apparatus may include a transmitter configured to exchange information about usage of radio resources with a base station.

In certain embodiments, the demodulating unit may be configured to demodulate the received data stream using a modulation constellation. In certain embodiments, the demodulating unit may be configured to demodulate the training sequence with a first modulation constellation and to demodulate the payload data with a second modulation constellation. In certain embodiments, the second modulation constellation may be phase shifted with respect to the first modulation constellation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT(S)

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the term data has been used in the description of the present invention, the invention may be applied to many types of network data. For purposes of this invention, the term data includes packet, cell, frame, datagram, bridge protocol data unit packet, packet data, packet payload and any equivalents thereof.

Figure 1:
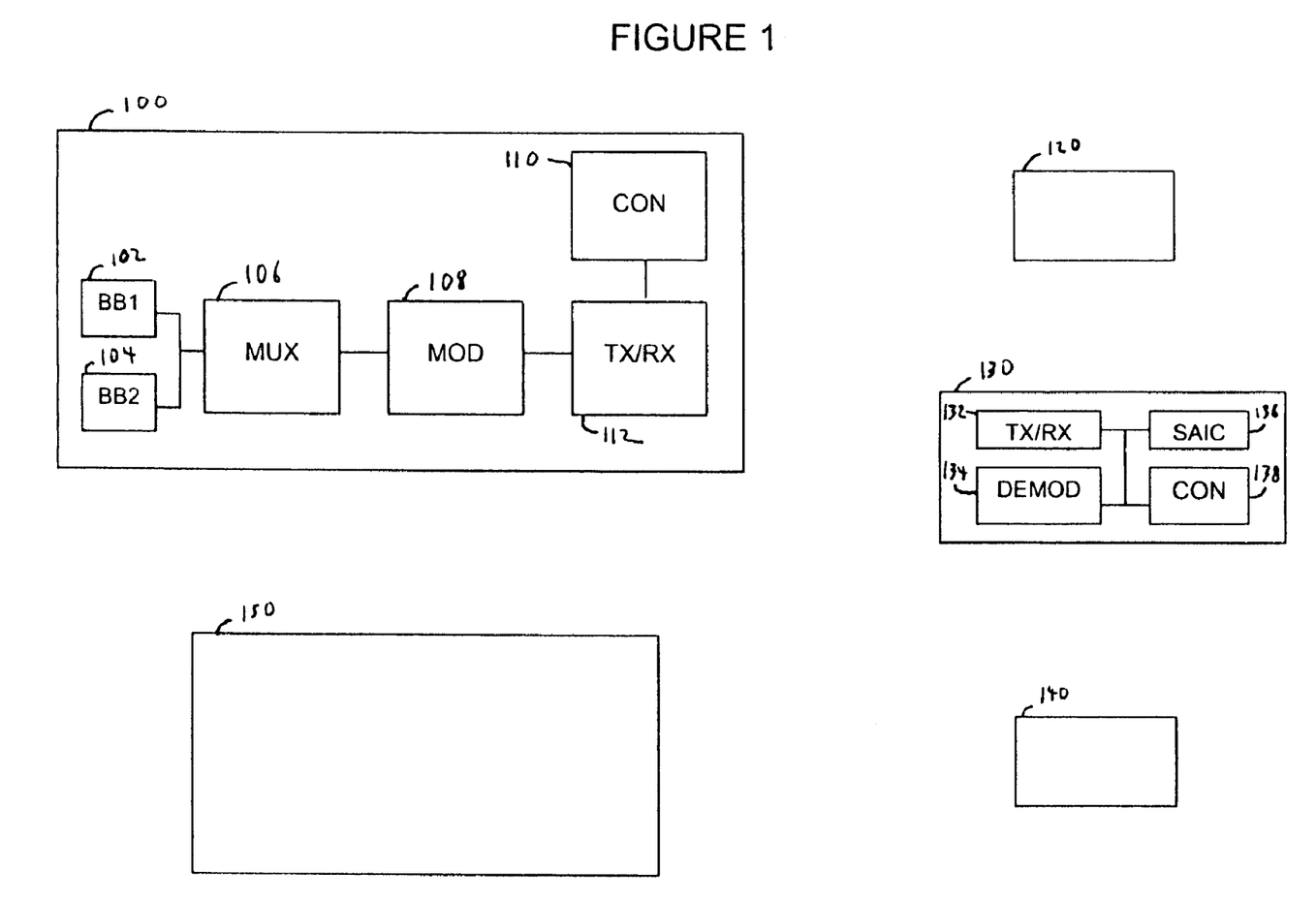
FIG. 1 is an architectural diagram illustrating a mobile communication system in accordance with an embodiment of the present invention.

FIG. 1 is an architectural diagram depicting a mobile communication system, in accordance with an embodiment of the present invention. The communication system includes two base stations 100 and 150 and three user terminals 120, 130 and 140. User terminals 120 and 130 are located within the coverage area of base station 100 and user terminal 140 is located within the coverage areas of both base stations 100 and 150. As such, user terminal 140 may interfere with, and receive interference from, base station 100. While not specifically illustrated in FIG. 1, a person of ordinary skill in the art will appreciate that in some embodiments, user terminals 120 and 140 may have similar features to user terminal 130 and that base station 150 may have similar features to base station 100.

A person of ordinary skill in the art will readily appreciate that "user terminal" may be embodied as a cellular telephone, a computer with a wireless network card, a personal digital assistant (PDA) or the like. A person of ordinary skill in the art will also readily appreciate that a "base station" could also be embodied as a server, a router, or any other suitable network device, or combination of devices. Presenting the above-described functions as being performed by a "base station" and/or a "user terminal" is not intended to limit the scope of the present invention in any way, but is intended to provide one example of many embodiments of the present invention. Indeed, method, system and apparatus disclosed herein may be implemented in localized and distributed forms consistent with networking technology.

The mobile communication system depicted in FIG. 1 may be a Global System for Mobile communication (GSM) network. A GSM network is generally a Time Division Multiple Access (TDMA) radio system, where a radio resource at a given time is defined by a combination of a frequency and a time slot. Time slots may be transmitted in a radio frame, typically including eight time slots. Although the system depicted in FIG. 1 may be a GSM network, the claimed invention is not limited to a GSM network and as such, may be applied to other radio systems as well.

A GSM network includes a plurality of traffic channels and control channels. As examples of traffic channels, Traffic Channel at Full Rate (TCH/F) and Traffic Channel at Half Rate (TCH/H) may be used for voice communication. TCH/F uses a whole radio resource for the communication of a single user, whereas TCH/H is a half rate channel in which two users share a resource and use the radio resource alternately.

A signal transmitted in a time slot may be called a radio burst and consists of symbols carrying one or more bits per each symbol. A typical radio burst includes a period for a training sequence, data symbols on both sides of the training sequence, and tail symbols at the ends of the burst. A receiver uses the training sequence for equalizing channel distortion on the burst. The structure and the modulation of the bursts may vary depending on the channel on which they are transmitted.

The base station 100 contains two baseband units 102 and 104, each of which is configured to process baseband data for one user terminal (in this case, user terminals 120 and 130, respectively). Baseband data streams from the baseband units 102 and 104 may be delivered to a multiplexing unit 106 that combines the data streams for the modulating unit 108. Alternatively, the data streams of different user terminals may be kept separate and provided directly from the baseband entities 102 and 104 to the modulating entity 108.

In FIG. 1, user terminals 120 and 130 communicate with base station 100 via radio links. The user terminals may both be standard mobile stations, or one or more of the user terminals may include new functionality to facilitate simultaneous communication on the same radio resource. Such user terminals including the new functionality may be capable of monitoring multiple subchannels.

The user terminal 130 may include a transceiver unit 112 that is capable of communication with base station 100. The user terminal 130 may also include a control unit 138 that may correspond to a control unit 110 of the base station 100. The control units 110 and 138 may be configured to exchange information pertaining to usage of radio resources in the downlink. The user terminal 130 may also include a demodulating unit 134 that may be a counterpart to modulating unit 108 in base station 100. The demodulating unit 134 may be configured to demodulate a signal that was modulated by modulating unit 108 of base station 100 and intended for user terminal 130. The user terminal 130 may also include a Single Antenna Interference Cancellation (SAIC) unit 136 that cancels interference from other base stations (such as base station 150). The SAIC unit 136 may cancel binary phase-shift keying (BPSK), Gaussian minimum shift keying (GMSK) interference signals, or the like, when a desired signal is also BPSK, GMSK, or the like, by making interference orthogonal to the desired signal. The user terminal 120 may or may not include similar components to user terminal 130, and user terminal 120 may also be capable of performing SAIC operations for interference from base station 100.

A data stream provided for modulating unit 108 in base station 100 may contain data that is intended for user terminals 120 and 130 such that alternate bits of the data stream are intended for user terminal 120 and for user terminal 130, respectively. The data transmitted to the first user terminal 120 may be called a first subchannel, and the data transmitted to a second user terminal, such as user terminal 130, may be called a second subchannel. The subchannels may use the same communication resource or radio resource, such as a frequency-time slot combination, simultaneously.

The separation of subchannels may be provided at the base station 100 by using orthogonal training sequence pairs for the subchannels such that the first subchannel may use a first training sequence and the second subchannel may use a second, different training sequence. At the receiving end, both user terminals 120 and 130 are able to receive their own signal by equalizing the received signal using the training sequence that has been allocated for the respective user terminal.

The modulation method used by the modulating unit 108 of base station 100 may provide a constellation of rectangular and antipodal four quadrature amplitude modulation (4-QAM). Such a constellation may provide subchannel-specific signal power when the constellation is non-square. Both non-square and square 4QAM constellations may be provided by a subset of 8 Phase Shift Keying (8PSK), 16 Phase Shift Keying (16PSK), 16 Quadrature Amplitude Modulation (16QAM) or 32 Quadrature Amplitude Modulation (32QAM) modulation constellations. The higher the order of the modulation constellation that is used, the more suitable the square or non-square 4-QAM constellation subsets with different sub-signal signal power combinations that can be found. The non square modulation constellations may provide more signal power for one subchannel and less signal power for another subchannel in order to facilitate subchannel-specific power control. If a non-square constellation is fixed, the signal power difference between subchannels may be, for instance, 7.7 dB.

To enable finer granularity on subchannel-specific power control, different non-square 4QAM constellations providing different signal power for subchannels may be alternated during the interleaving period. When 0, ¼, ½, ¾ or all of the bursts of the interleaving period are using non-square constellations providing 7.7 dB lower power than in other non-square constellations, the average power over the interleaving period may be −7.7, −4.2, −2.3, 1.0 or 0.0 lower. These steps may provide sufficient granularity for subchannel-specific power control purposes. It is to be noted that 7.7 dB is used by way of example only. While 7.7 dB is discussed here, a person of ordinary skill in the art will appreciate that other values are possible, so long as the power difference is sufficient such that the training sequence pairs are at least substantially orthogonal.

In addition to a 4QAM constellation, a symbol rotation may need to be considered, such as π/4, 3π/8 or π/2. The 3π/8 rotated symbols for the current 8PSK may be defined as in equation (1), where i is the index of a symbol s and j is an imaginary unit:

$$\hat{s}_i = s_i \cdot e^{j3\pi/8} \quad (1)$$

Symbol rotation may be selected to optimise performance, to avoid zero crossings or to provide compatibility with standard GMSK mobile stations or base stations. Differential encoding may be applied at least for the payload period on each subchannel. In other words, every other bit may be used to enable a user terminal, such as user terminal 130, to use binary demodulation. The user terminal may demodulate possible symbol rotation and possible differential encoding by performing a symbol rotation for the received samples with a rotation angle that facilitates the use of a binary receiver, such as GMSK or BPSK.

The modulating unit 108 may use subsets of the 8PSK modulation constellation with a π/2 symbol rotation. These subsets have only 4 points of the 8PSK constellation that are used by the 4QAM modulation as shown by black dots in FIGS. 6(a)-(c), which are discussed in more detail later. The modulating unit 108 may thus map bits of the data stream received from the multiplexing unit 106 as in 4QAM, having two bits per modulation symbol on the modulation constellation, where the first bit of the symbol is intended for the first subchannel and second bit is intended for the second subchannel.

The user terminals 120 and 130 may use a BPSK demodulation method, such as standard GMSK demodulation, to receive one of the subchannels of the 4QAM modulated signal. Upon receiving a symbol, the user terminal 120 may be configured to monitor only the situation with respect to the I or Q axis. The user terminal 120 may only be interested in the first bit of the received symbol. If the original transmitted symbol was "10" or "11", that is, the reception refers to the right from the Q-axis, the user terminal 120 may conclude that the intended symbol is "1". Accordingly, if the transmitted symbol was "01" or "00", the user terminal 120 may conclude that the received symbol is "0". The user terminal 130 may be interested in the second bit of the received symbol. If the original transmitted symbol was "10" or "00", that is, the reception refers to below the I-axis, the user terminal 130 may conclude that the intended symbol is "0". Accordingly, if the transmitted symbol was "01" or "11", the user terminal 130 may conclude that the intended symbol is "1".

The user terminals 120 and 130 may use 4QAM and detect only the even or odd bits of the payload period corresponding to the configured subchannel. Thus, separation of channels is based on configuring which bit of the 4QAM symbol in a data period is of interest. In addition, a separate ciphering may be applied to communication for the subchannels to avoid accidental misuse of the wrong subchannel. Finally, the modulated signals may be provided to a transceiver unit 112 for further processing before transmitting the signal.

The user terminal 130 may be a user terminal that is capable of receiving on a second subchannel. To be able to communication on the second subchannel, the control units 110 and 138 may exchange information about the usage of the second subchannel. At connection setup, the control unit 138 may indicate to the control unit 110 that the user terminal 130 is capable of communicating on the second subchannel. In the reverse direction, the control unit 110 may indicate to the control unit 138 that a second subchannel on a given radio resource has been allocated to the user terminal 130. In an embodiment, the allocation indicates to the user terminal 130 a training sequence that should be used on the channel. These messages may be included in existing signalling messages transmitted on a control channel used during connection setup in SDDCH (Standalone Dedicated Control Channel) or FACCH (Fast Associated Control Channel). The user terminal 130 is also capable of cancelling interference from other base stations (such as base station 150) by means of SAIC processing. The user terminal 130 may use training sequences of both subchannels during channel estimation in order to improve performance. This may be beneficial, for instance, when a lower power subchannel is allocated for the user terminal 130.

The user terminals 120 and 130 may report downlink signal properties (such as signal level and quality) using SACCH signalling to the base station 100, which in turn can use that information to perform power control in downlink. Power control may be normal power control, where the higher power of two subchannels is used as carrier power, and a non-square modulation constellation may be used to enable subchannel-specific power control.

The mobile station 130 also includes a demodulating unit 134. The demodulating unit 134 is a counterpart of the modulating unit 108 in the base station in that the demodulating unit 134 is configured to demodulate the signal modulated by the modulating unit 108. The demodulating unit 134 is thus configured to demodulate a signal transmitted on the second subchannel.

The user terminal 140 may be capable of performing SAIC and may be able to suppress the non-square 4QAM constellation transmitted by base station 100 up to the power difference between the first and second subchannels (for example, up to 7.7 dB), when receiving GMSK or 4QAM signals from the base station 150. This suppression for 4QAM is possible because the constellation is not square, but rather rectangular, and thus looks like a "semi binary" signal from the user terminal's point of view. The SAIC processing may include mitigating Inter Symbol Interference (ISI). The above-described embodiments may also be combined such that base stations may provide transmissions on both subchannels with different training sequences, and additionally use a 4QAM receiver.

Discontinuous transmission (DTX) may be taken into account. This means that at a certain moment in time, there may be no transmission for one of the user terminals. DTX on one subchannel may be taken into account by using zeroes or other idle patterns on a channel that has no active transmission. Alternatively, the base station 100 may use lower order modulation during DTX on one subchannel. For instance, 4QAM could be changed to BPSK or GMSK during the DTX period on the other subchannel. Alternatively, in some embodiments, only the payload period may use BPSK as a modulation constellation, while the training sequence may be 4QAM modulated.

A radio system in accordance with FIG. 1 may be a TDMA radio system that implements a frequency hopping algorithm. The base station 100 may transmit to user terminals 120 and 130 using the same radio resource simultaneously. In other words, a combination of frequency and time slot may be allocated to both user terminals at the same time, and the resource may be either a traffic channel resource or a control channel resource.

The user terminal 130 may indicate to the base station that the mobile station is capable of receiving on a second subchannel. The base station 100 may allocate user terminals 120 and 130 substantially or completely mutually orthogonal training sequences for use in downlink communication. The base station 100 may allocate user terminals to the time slots. If the base station 100 receives an indication from a mobile station that the mobile station is capable of receiving on an orthogonal second subchannel, the base station 100 may allocate the user terminal accordingly. In other words, the base station 100 may allocate a time slot to two user terminals, such as 120 and 130, one of which is a standard mobile station not capable of supporting a second subchannel, and one of which is capable of supporting such communications.

The base station 100 may provide two data streams, one for each user terminal 120 and 130. The data streams may also be directed to a single user terminal. Initially, the two data streams may be provided in a QPSK data stream form such that the data bits are alternately directed to user terminals 120 and 130, respectively. Then, the data bits of the original data stream may be divided into a first data stream and a second data stream. The quaternary QPSK data stream is thereby divided to give two binary GMSK or BPSK deploying possible symbol rotation compatible data streams, of which one is directed to one user terminal and the other is directed to the other user terminal. The data modulated by using a higher order modulation scheme may thus be received by using a lower order modulation at the user terminals. The user terminals may then omit some of the received bits. The two data streams may be modulated by the modulating unit 108 and then simultaneously transmitted using the same radio resource, which has been reserved and an indication of which has been provided to the user terminals 120 and 130.

From the user terminal's point of view, the user terminal may perform the following tasks. At first, when setting up the connection, the user terminal may need to indicate to the base station 100 that the user terminal is capable of receiving on an orthogonal subchannel (OSC). Then, the user terminal may receive an indication from the base station 100 that a first or second channel has been allocated to the user terminal. Then, when receiving transmission on the second channel, the user terminal may demodulate at least part of the burst data by using a demodulation constellation similar to the modulation constellation used by the base station 100 when modulating data on the second channel. In an embodiment, the user terminal demodulates the training sequence with a first modulation constellation and the payload data with a second modulation constellation. The second modulation constellation may be phase shifted 90 degrees with respect to the first modulation constellation.

The concept of an orthogonal sub-channel may be provided in a GSM system for the following channels: TCH/F (Traffic Channel at Full Rate), SACCH/F/H (Slow Associated Control Channel at Full/Half rate), FACCH/F/H (Fast Associated Control Channel at Full/Half Rate), SDCCH (Standalone Dedicated Control Channel), (P)RACH ((Packet)Random Access Channel), (P)AGCH ((Packet)Access Grant Channel), (P)PCH ((Packet)Paging Channel). The capacity of these channels may be doubled by providing a subchannel using the same resource as the original channel. It is also possible to mix the OSC with other multiple access principles, such as with time division multiple access (TDMA).

Figure 2:
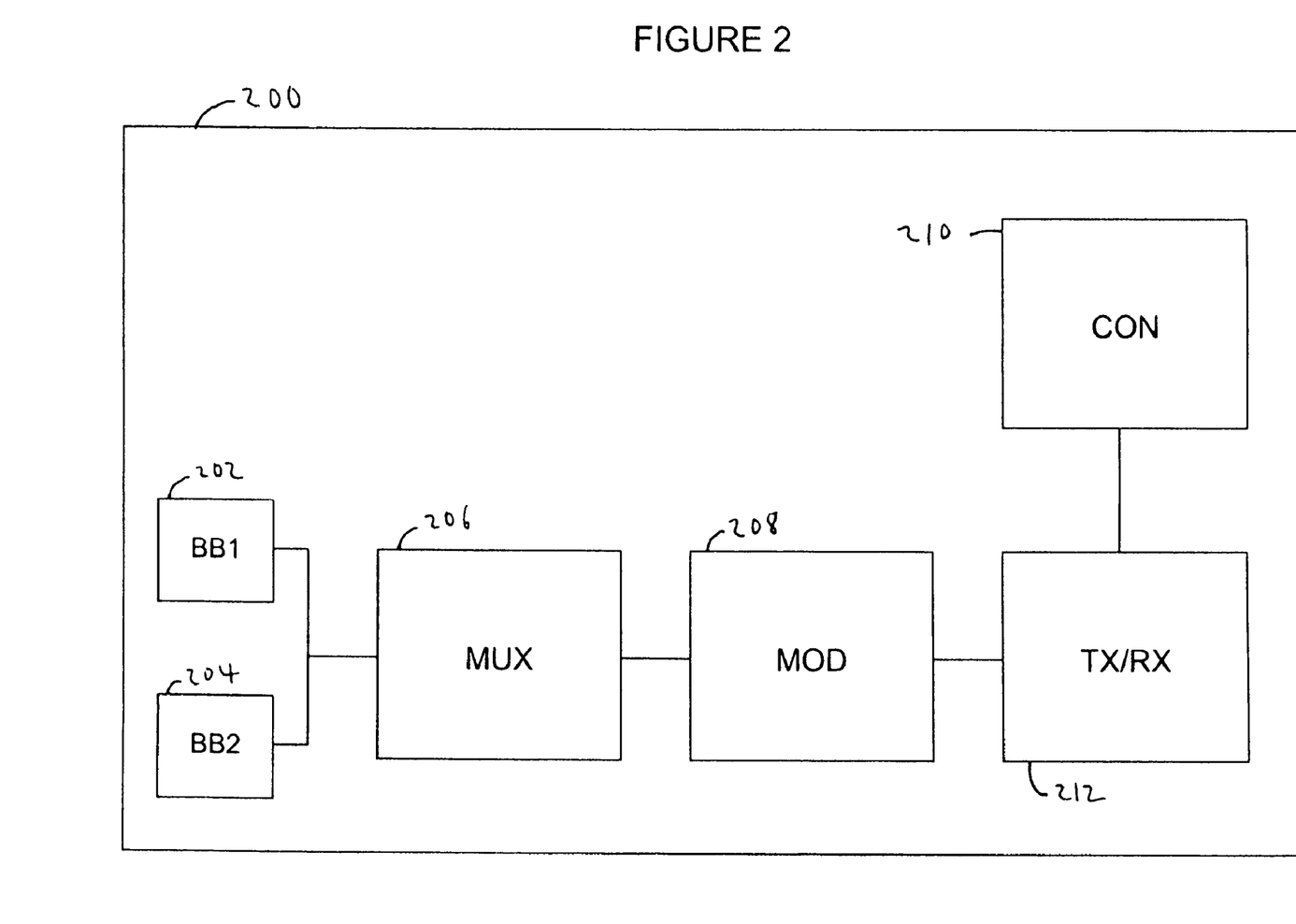
FIG. 2 is a block diagram illustrating a base station in accordance with an embodiment of the present invention.

FIG. 2 is a block diagram depicting a base station 200 in accordance with an embodiment of the present invention. The depicted base station 200 includes two baseband units 202 and 204, a multiplexing unit 206, a modulating unit 208, a control unit 210 and a transceiver unit 212. In certain embodiments, the base station 200 may have a similar function to the base station 100 and/or the base station 150 of FIG. 1.

The control unit 210 may be configured to provide a plurality of data streams in respective subchannels. The control unit 210 may also be configured to modulate a first data stream of the plurality of data streams at least partially with a different modulation constellation than a second data stream of the plurality of data streams via the modulating unit 208. The base station 200 may also include a transmitter, such as transceiver unit 212, that is configured to transmit the first and second data streams using a same radio resource to user terminals using different subchannels of the radio resource. The radio resource may be a frequency, a timeslot, or a combination thereof. The modulating of the first and second subchannel may differ with respect to payload data of a radio burst and the first and second subchannels may share a common training sequence. The first and second subchannel may use substantially or completely mutually orthogonal training sequence pairs such that the first and the second subchannels use different training sequences.

The control unit 210 may be configured to provide signal power for a first subchannel that is larger than signal power provided for a second subchannel. The control unit 210 may be configured to determine downlink data reception properties for signals received by the user terminals based on information exchanged with the user terminals. The control unit 210 may also be configured to estimate a required output power for the plurality of subchannels. The control unit 210 may further be configured to determine a difference in the required output power between the subchannels. Additionally, the control unit 210 may be configured to select one or more of appropriate modulation constellations and fractions over time based on the determined difference in required output power between the subchannels. The base station 200 may be configured to rotate symbols of the data streams.

It should be noted that many of the functional features described in this specification have been presented as units in order to more particularly emphasize their implementation independence. For example, a unit may be implemented as a hardware circuit comprising custom very large scale integration (VLSI) circuits or gate arrays, off-the-shelf semiconductors such as logic chips, transistors or other discrete components. A unit may also be implemented in programmable hardware devices such as field programmable gate arrays, programmable array logic, programmable logic devices or the like.

Units may also be at least partially implemented in software for execution by various types of processors. An identified unit of executable code may, for instance, comprise one or more physical or logical blocks of computer instructions that may, for instance, be organized as an object, procedure or function. Nevertheless, the executables of an identified unit need not be physically located together, but may comprise disparate instructions stored in different locations that, when joined logically together, comprise the unit and achieve the stated purpose for the unit. Units may be stored on a computer-readable medium that may be, for instance, a hard disk drive, flash device, random access memory (RAM), tape, optical drive, or any other such medium used to store data.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
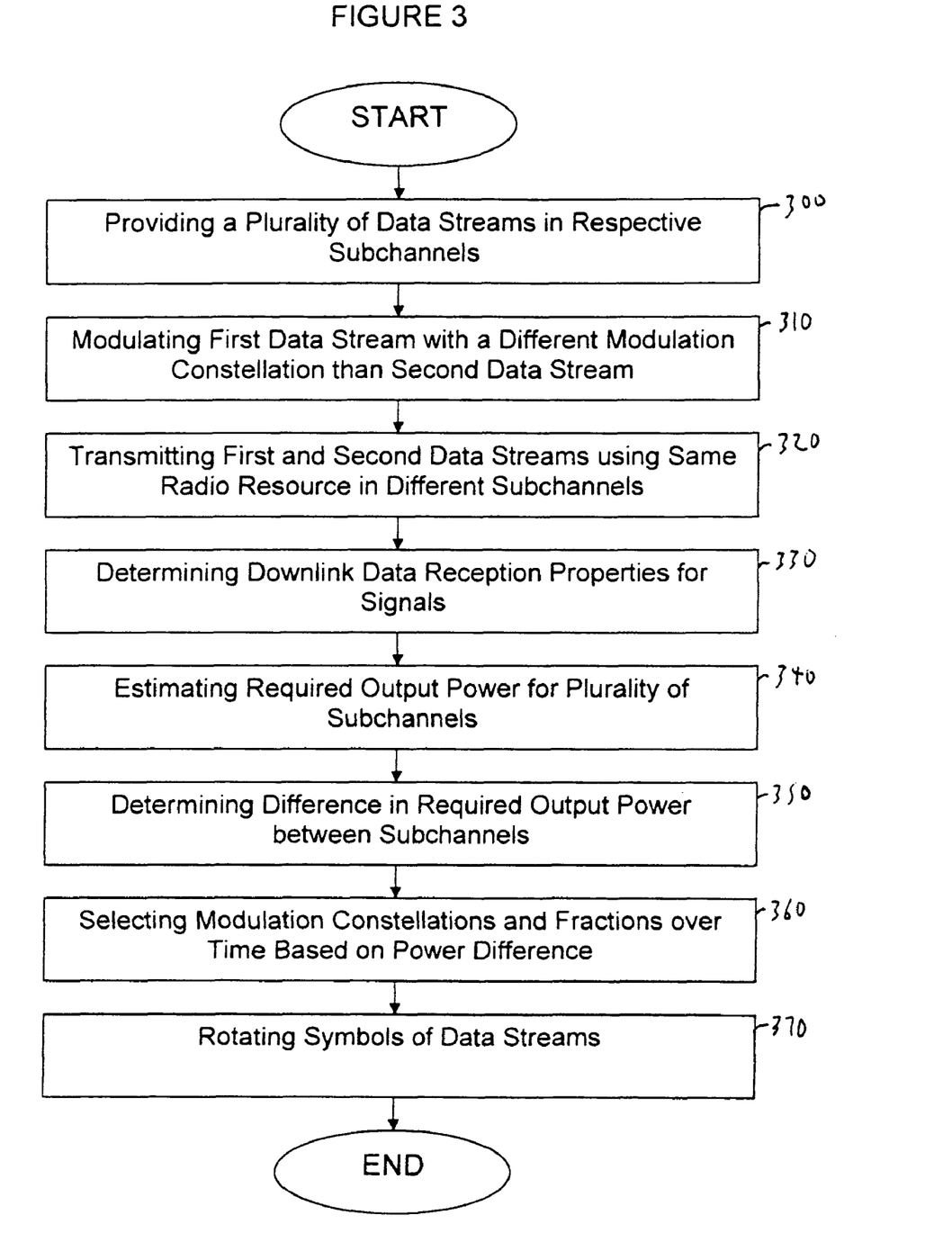
FIG. 3 is a flow diagram illustrating a method in accordance with an embodiment of the present invention.

FIG. 3 is a flow diagram depicting a method in accordance with an embodiment of the present invention. In some embodiments, the method depicted in FIG. 3 may be performed by the base stations 100, 150 and/or 200 of FIGS. 1 and 2.

The depicted method includes providing a plurality of data streams in respective subchannels 300. The method also includes modulating a first data stream of the plurality of data streams at least partially with a different modulation constellation than a second data stream of the plurality of data streams 310. The method further includes transmitting the first and second data streams using a same radio resource to user terminals using different subchannels of the radio resource 320. The radio resource may be a frequency, a timeslot, or a combination thereof. Modulating of a first and a second subchannel may differ with respect to payload data of a radio burst and the first and second subchannels may share a common training sequence. The first and second subchannel may use substantially or completely mutually orthogonal training sequence pairs such that the first and the second subchannels use different training sequences.

Signal power may be provided for a first subchannel that is larger than signal power provided for a second subchannel. In such a case, the method may include determining downlink data reception properties for signals received by the user terminals based on information exchanged with the user terminals 330. The method may also include estimating a required output power for the plurality of subchannels 340. The method may further include determining a difference in the required output power between the subchannels 350. Additionally, the method may include selecting one or more of appropriate modulation constellations and fractions over time based on the determined difference in required output power between the subchannels 360. In some embodiments, the method may also include rotating symbols of the data streams 370.

Figure 4:
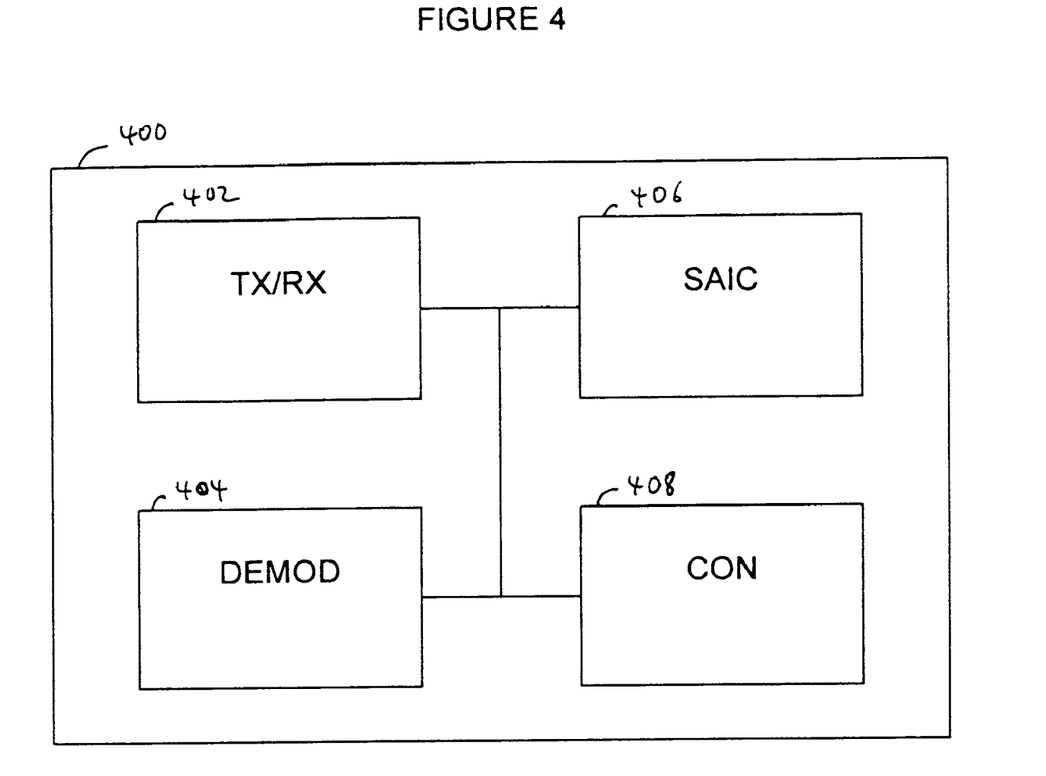
FIG. 4 is a block diagram illustrating a user terminal in accordance with an embodiment of the present invention.

FIG. 4 is a bock diagram depicting a user terminal 400 in accordance with an embodiment of the present invention. The user terminal 400 includes a transceiver unit 402, a demodulating unit 404, an interference cancellation unit 406 and a control unit 408. In certain embodiments, the user terminal 400 may have a similar function to one or more of the user terminals 120, 130 and 140 of FIG. 1.

The transceiver unit 402 may be configured to receive a training sequence and an indication of an allocated subchannel and to receive a data stream. The demodulating unit 404 may be configured to demodulate the received data stream to determine a signal intended for the user terminal 400 based on the received training sequence and the subchannel allocation. The user terminal 400 may also include an interference cancellation unit 406 (which may correspond to the SAIC unit 136 depicted in FIG. 1) configured to perform single antenna interference cancellation for binary phase-shift keying interference. The transceiver unit 402 may be configured to transmit an indication that the apparatus is capable of receiving data on an orthogonal subchannel. The transceiver unit 402 may be configured to exchange information about usage of radio resources with a base station.

The demodulating unit 404 of the user terminal 400 may be configured to demodulate the received data stream using a modulation constellation. The demodulating unit 404 may also be configured to demodulate the training sequence with a first modulation constellation and to demodulate the payload data with a second modulation constellation. The second modulation constellation may be phase shifted with respect to the first modulation constellation.

Figure 5:
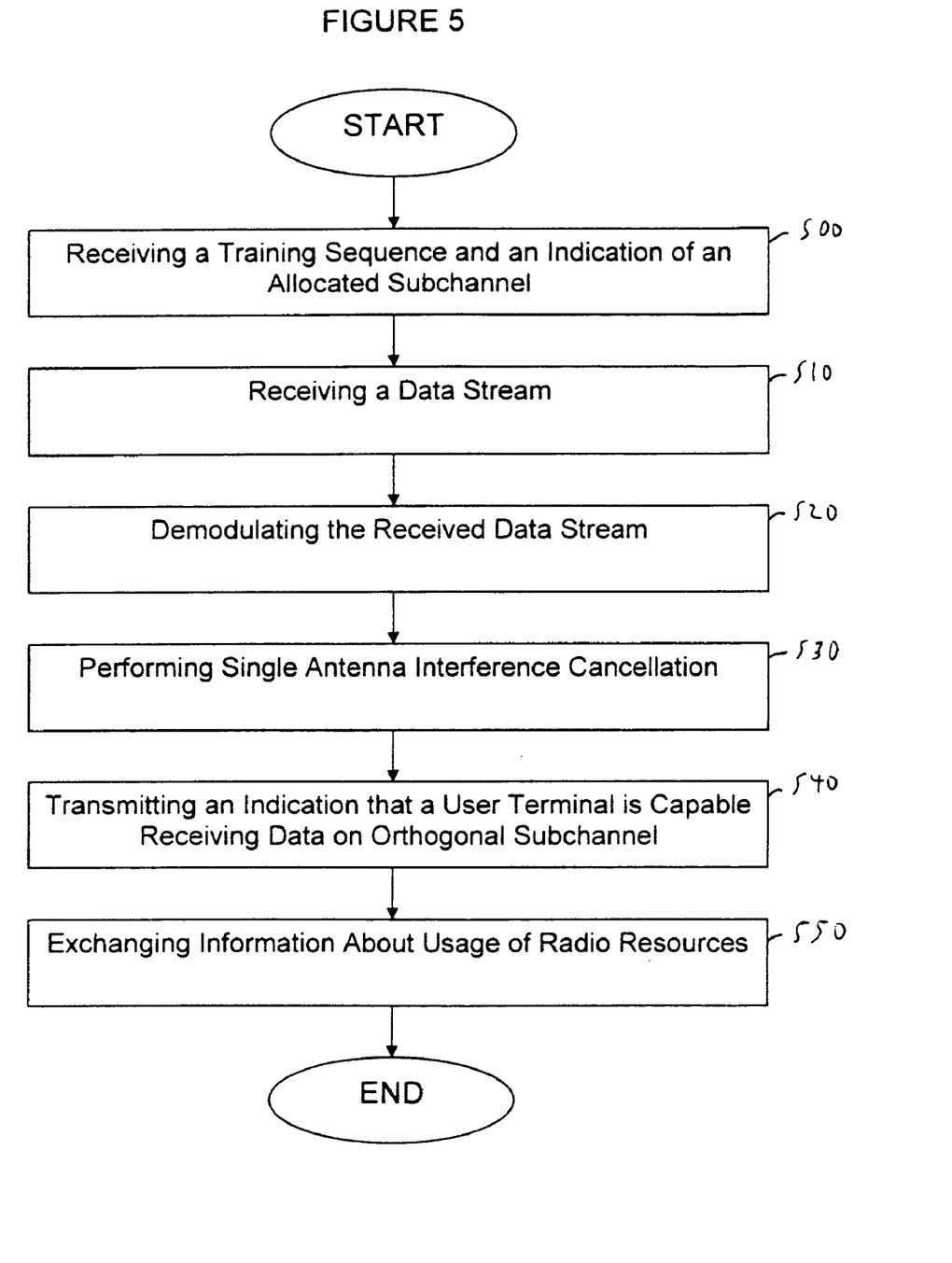
FIG. 5 is a flow diagram illustrating a method in accordance with an embodiment of the present invention.

FIG. 5 is a flow diagram depicting a method in accordance with an embodiment of the present invention. In some embodiments, the method depicted in FIG. 5 may be performed by the user terminals 120, 130, 140 and/or 400 of FIGS. 1 and 4.

The depicted method includes receiving a training sequence and an indication of an allocated subchannel 500 and receiving a data stream 510 from a device such as a base station. The method also includes demodulating the received data stream to determine a signal intended for a user terminal based on the received training sequence and the subchannel allocation 520. The method may include performing single antenna interference cancellation for binary phase-shift keying interference 530. The method may include transmitting an indication that the user terminal is capable of receiving data on an orthogonal subchannel 540. The method may include exchanging information about usage of radio resources with a base station 550.

The received data stream may be demodulated using a modulation constellation. The training sequence may demodulated with a first modulation constellation and payload data is demodulated with a second modulation constellation. The second modulation constellation may be phase shifted with respect to the first modulation constellation.

Figure 6A:
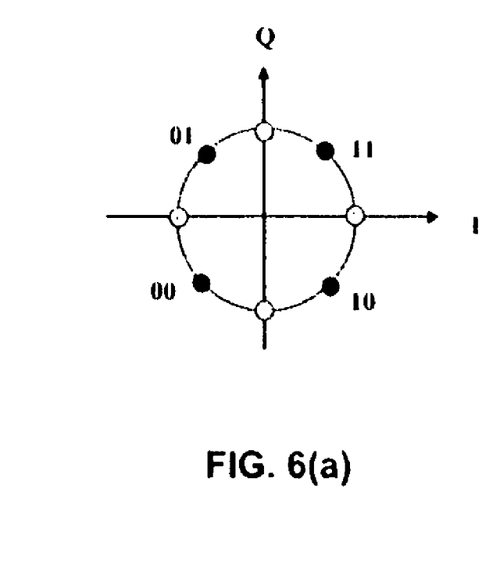
FIGS. 6(a)-(c) are Q/I graphs illustrating 8PSK constellations.
Figure 6B:
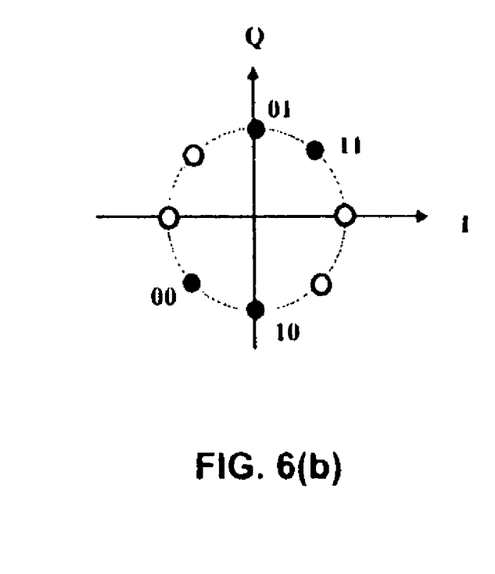
Figure 6C:
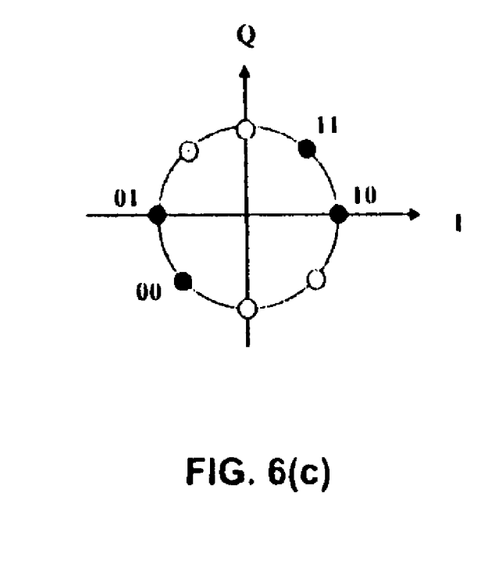

FIGS. 6(a)-(c) are Q/I graphs depicting 8PSK modulation constellations. The constellations carry a first subchannel and second subchannel where an orthogonal data stream has alternating bits. The first bit is used in the first subchannel and the second bit is used in the second subchannel. The constellation depicted in FIG. 6(a) has equal signal powers for both of the subchannels. In FIG. 6(b), the first subchannel is attenuated by 7.7 dB and in FIG. 6(c), the second subchannel is attenuated by 7.7 dB. While a 7.7 dB attenuation is depicted here, as discussed above, a person of ordinary skill in the art will appreciate that other attenuation values are possible, so long as the power difference is sufficient such that the training sequence pairs are at least substantially orthogonal.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

I claim:

1. A method, comprising:
providing a plurality of data streams in respective subchannels;
modulating a first data stream of the plurality of data streams at least partially with a different modulation constellation than a second data stream of the plurality of data streams;
transmitting the first and second data streams using a same radio resource to user terminals using different subchannels of the radio resource, wherein signal power provided for a first subchannel is larger than signal power provided for a second subchannel;
determining downlink data reception properties for signals received by the user terminals based on information exchanged with the user terminals;
estimating a required output power for the plurality of subchannels;
determining a difference in the required output power between the subchannels; and
selecting one or more of appropriate modulation constellations and fractions over time based on the determined difference in required output power between the subchannels.

2. The method of claim 1, wherein the radio resource is a frequency, a timeslot, or a combination thereof.

3. An apparatus, comprising:
a control unit configured to
provide a plurality of data streams in respective subchannels,
modulate a first data stream of the plurality of data streams at least partially with a different modulation constellation than a second data stream of the plurality of data streams,
provide signal power for a first subchannel that is larger than signal power provided for a second subchannel,
determine downlink data reception properties for signals received by the user terminals based on information exchanged with the user terminals,
estimate a required output power for the plurality of subchannels,
determine a difference in the required output power between the subchannels, and
select one or more of appropriate modulation constellations and fractions over time based on the determined difference in required output power between the subchannels; and
a transmitter configured to transmit the first and second data streams using a same radio resource to user terminals using different subchannels of the radio resource.

4. The apparatus of claim 3, wherein the radio resource is a frequency, a timeslot, or a combination thereof.

5. A computer program embodied on a non-transitory computer-readable medium, the program configured to control a processor to perform a process, the process comprising:
providing a plurality of data streams in respective subchannels;

modulating a first data stream of the plurality of data streams at least partially with a different modulation constellation than a second data stream of the plurality of data streams;

transmitting the first and second data streams using a same radio resource to user terminals using different subchannels of the radio resource, wherein signal power provided for a first subchannel is larger than signal power provided for a second subchannel;

determining downlink data reception properties for signals received by the user terminals based on information exchanged with the user terminals;

estimating a required output power for the plurality of subchannels;

determining a difference in the required output power between the subchannels; and selecting one or more of appropriate modulation constellations and fractions over time based on the determined difference in required output power between the subchannels.

6. The computer program of claim 5, wherein the radio resource is a frequency, a timeslot, or a combination thereof.

* * * * *